United States Patent
Wu et al.

(10) Patent No.: US 8,965,127 B2
(45) Date of Patent: Feb. 24, 2015

(54) METHOD FOR SEGMENTING TEXT WORDS IN DOCUMENT IMAGES

(71) Applicants: Chaohong Wu, Mountain View, CA (US); Wei Ming, Cupertino, CA (US)

(72) Inventors: Chaohong Wu, Mountain View, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 37 days.

(21) Appl. No.: 13/826,093

(22) Filed: Mar. 14, 2013

(65) Prior Publication Data

US 2014/0270526 A1 Sep. 18, 2014

(51) Int. Cl.
*G06K 9/34* (2006.01)

(52) U.S. Cl.
CPC ..................................... *G06K 9/348* (2013.01)
USPC ............................. 382/177; 382/173; 382/176

(58) Field of Classification Search
USPC .......................... 382/173, 177, 186, 187, 176; 365/230.02, 230.03, 200; 703/26, 27; 704/2, 232; 710/14, 22, 27, 28; 711/E12.058
See application file for complete search history.

(56) References Cited

U.S. PATENT DOCUMENTS 6,393,395 B1 * 5/2002 Guha et al. .................... 704/232
7,596,272 B2 * 9/2009 Sternby .......................... 382/186

OTHER PUBLICATIONS

Arthur et al., "k-means++: The Advantage of Careful Seeding", 18th annual ACM-SIAM symposium on Discrete algorithms, 2007.
"Clustering", Opencv documentation, http://docs.opencv.org/modules/core/doc/clustering.html, 3 pages, printed from internet on Aug. 7, 2014.
Kim et al. "Word Segmentation of Printed Text Lines Based on Gap Clustering and Special Symbol Detection", 16th international conference on Pattern Recognition (2002).
Tsai et al., "Chinese Word Segmentation with Minimal Linguistic Knowledge: An Improved Conditional Random Fields Coupled with Character Clustering and Automatically Discovered Template Matching", Information Reuse and Integration, 2006 IEEE International Conference, Sep. 16-18, 2006, pp. 274-279.

* cited by examiner

*Primary Examiner* — Anh Do
(74) *Attorney, Agent, or Firm* — Chen Yoshimura LLP

(57) ABSTRACT

A word segmentation method for processing a document image applies clustering analysis to the spacing segments of a line. The spacing segments are generated by thresholding a one-dimensional vertical projection profile of the line. Taking advantage of the bimodal distribution of spacing length distribution of text lines, a k-means clustering algorithm is used, with the number of clusters pre-set to two, to classify the spacing segments as either character spacing or word spacing. Moreover, k-means++ initialization is used to enhance performance of cluster analysis. The clustering result such as cluster centers and compactness is used to prune single-word text line, single table item, etc. The locations of the word spacing segments are then used to segment the line of text into words.

22 Claims, 3 Drawing Sheets

METHOD FOR SEGMENTING TEXT WORDS IN DOCUMENT IMAGES

BACKGROUND OF THE INVENTION

1. Field of the Invention

This invention relates to document image processing, and in particular, it relates to word segmentation, i.e. segmenting a document image into sub-images corresponding to words of the document.

2. Description of Related Art

A "document image" refers to a digital image representing a document which includes a substantial amount of text. For example, a document image may be generated by scanning a hard copy document, taking a photograph of a hard copy document, converting a text-based electronic document (e.g. a Word™ document) into an image format (e.g. PDF™), etc. "Document image processing" refers to various processing conducted for document images. One example of document image processing is optical character recognition (OCR), which aims to extract the textual content of the document. Another example of document image processing is document authentication, which aims to determine whether a target document image is the same as an original document image or whether it has been altered.

In some document image processing methods, a document image is segmented at various levels into blocks (e.g. paragraphs of text, photos, etc.), text lines segments, words segments, and/or symbol segments. These steps are sometimes referred to as paragraph (or block) segmentation, line segmentation, etc. and collectively referred to as document segmentation. Here, paragraph segment, line segment, etc. refer to sub-images that represent a paragraph, line, etc. of the document. In this disclosure, sometimes a paragraph segment, line segment, etc. is simply called a paragraph, line, etc., but it should be clear from the context of the disclosure that they refer to sub-images rather than the text of the paragraph, line, etc.

Word segmentation refers to segmenting lines into words. Many word segmentation methods are known. Some of these methods examine spacing segments (white spaces) in a text line to distinguish word spacing (space between neighboring words) and character spacing (space between neighboring characters within words). For example, Soo H. Kim, Chang B. Jeong, Hee K. Kwag, Ching Y. Suen. "Word segmentation of printed text lines based on gap clustering and special symbol detection", 16th international conference on Pattern Recognition (2002) (herein after "Kim et al. 2002"), describes a method which applies a hierarchical clustering method to spacing segments in a text line to distinguish word spacing and character spacing.

SUMMARY

The present invention is directed to an improved method for word segmentation that substantially obviates one or more of the problems due to limitations and disadvantages of the related art.

An object of the present invention is to provide a fast and accurate word segmentation method.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a word segmentation method for segmenting a text line image into a plurality of word images, which includes: (a) obtaining a plurality of one-dimensional spacing segments and symbol segments from the text line image, the spacing segments corresponding to white spaces within the text line image, and the symbol segments corresponding to text symbols within the text line image, each of the spacing segments having a length; (b) applying cluster analysis to the plurality of spacing segments, to classify the plurality of spacing segments into a plurality of character spacing segments and a plurality of word spacing segments based on their lengths, including applying a k-means algorithm with k-means++ initialization to the lengths of the plurality of spacing segments while setting a number of clusters to two; (c) obtaining the plurality of word images from the text line image by using the plurality of word spacing segments obtained in step (b).

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide methods for word segmentation, i.e., to segment a line segment of a document image into a plurality of word segments. Attention is paid to proper handling of short lines, in particular single word lines (including single word table items).

A word segmentation method according to embodiments of the present invention employs a k-means algorithm for cluster analysis to classify white spaces within a line into either word spacing (a space between neighboring words) or character spacing (a space between neighboring characters within a word). The word spacings are then used to separate the line segment into word segments. A compactness measure calculated by the k-means algorithm is used to prune the result to exclude single word lines (including single word table items). A preferred embodiment employs the k-means algorithm with k-means++ initialization while restricting the number of clusters to two.

Figure 1:
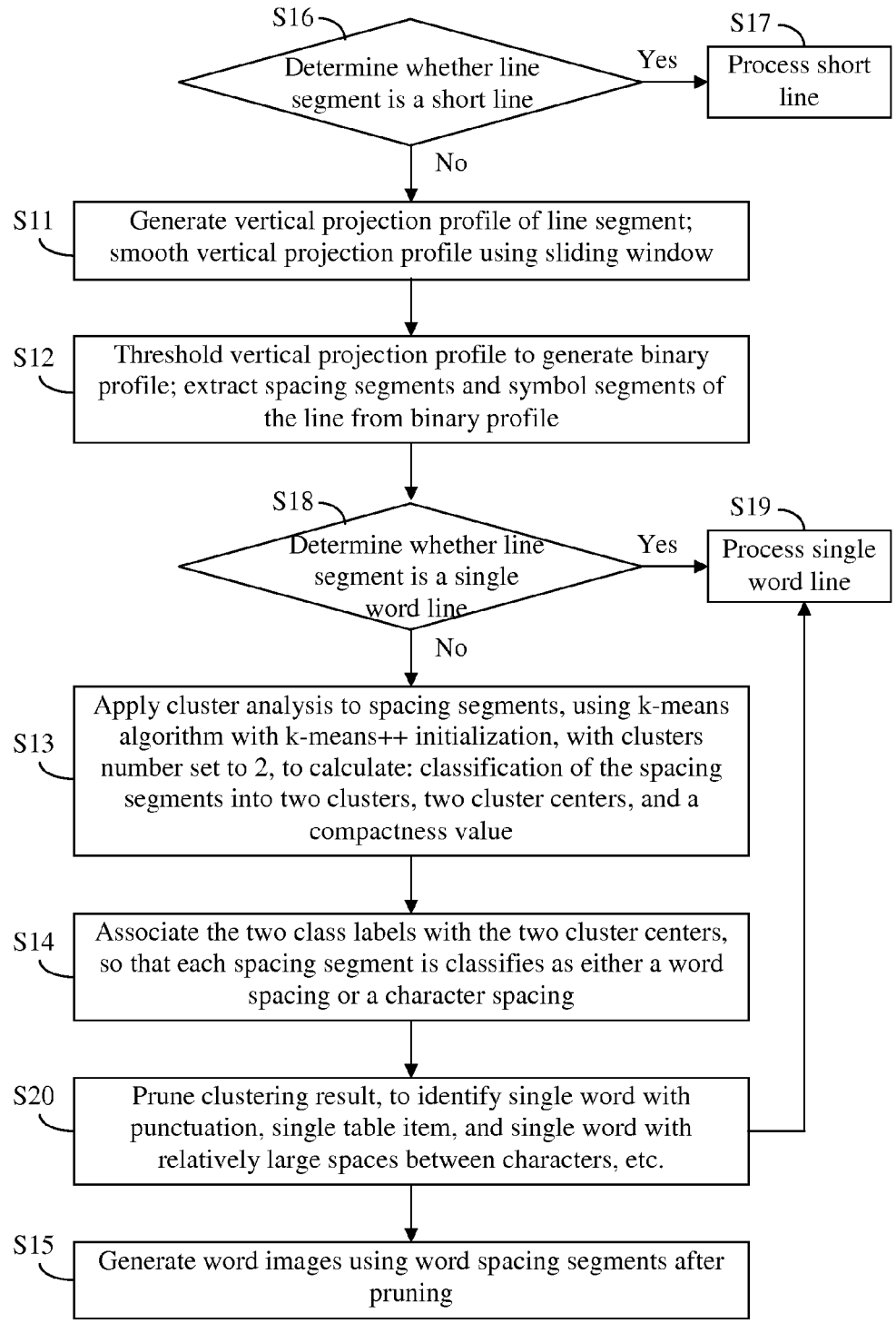
FIG. 1 schematically illustrates a word segmentation method according to an embodiment of the present invention.

FIG. 1 schematically illustrates a word segmentation method according to an embodiment of the present invention. The starting point of the method is a text line segment that has been generated from a binary document image. It is assumed that the line segmentation technique used to obtain the line segments generates a line bounding box that bounds the text in the line, without extra spaces at the beginning or end of the line. In the following descriptions, horizontal text lines are used as an example, but the method, with appropriate modification, can also be applied to languages containing vertical text lines.

The line segment is a rectangular shaped image having a number of pixels in the horizontal direction and a number of pixels in the vertical direction. The rectangular shape is referred to as the line bounding box. Each pixel has a binary value representing black or white.

As a preliminary step, a determination is made as to whether the line is a short line (steps S16 and S17). These steps will be explained in more detail later.

In step S11, a one-dimensional vertical projection profile f(x) of the line segment is generated, where x is the horizontal pixel position (e.g. from left to right) and f is the number of black pixels in the line bounding box at each horizontal pixel position. Preferably (but optionally), the vertical projection profile f(x) is smoothed using a sliding window (also referred to as a moving average method). In one example, the sliding window is 3 pixels wide.

In step S12, thresholding is applied to the vertical projection profile f(x) to generate a binary profile g(x), i.e., g(x)=1 if f(x)≥T and g(x)=0 if f(x)<T, where T is a threshold value. Thus, g(x)=0 means the pixel position x is within a white space of the line, and g(x)=1 means the pixel position x is not within a white space (i.e. it is a part of a character). Also in this step, spacing segments, i.e., consecutive pixel positions where the value of the binary profile g(x) is 0, are extracted from the binary profile. Each spacing segment, a one-dimensional object, is defined by a position value, such as its starting pixel position or its center pixel position (centroid), and the segment length, which is the number of consecutive pixels in that segment. The segments of consecutive pixel positions where the value of the binary profile g(x) is 1 are referred to as symbol segments. Spacing segments and symbol segments alternate within a line.

Steps S11 and S12 accomplish the task of generating a set of spacing segments from a text line. While one particular method using vertical projection profile is described here, other suitable methods may be used to generate spacing segments from a text line. Some known word segmentation algorithms, such as that described in Kim et al. 2002, involve a step of generating spacing segments from text lines.

A determination is made as to whether the line segment contains only one word (referred to as a single word line) (step S18), and if so, it is processed as a single word (step S19). These steps will be discussed in more detail later.

Figure 3:
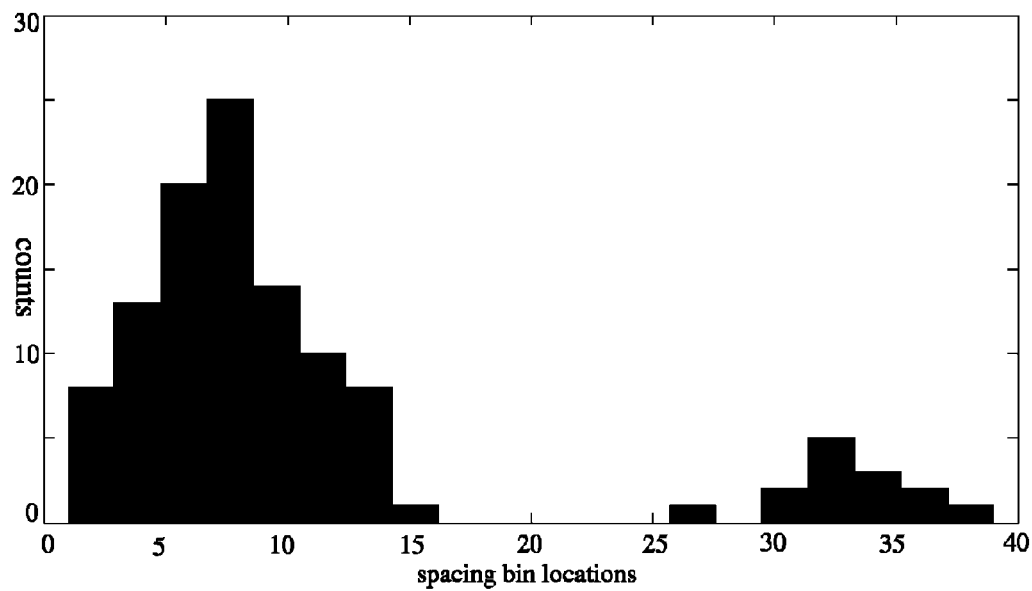
FIG. 3 schematically illustrates an exemplary spacing segment distribution of a line showing a bimodal distribution.

The spacing length distribution of a typical text line, which has more than one word, tends to have two distinct peaks, referred to as a bimodal distribution. This is due to the fact that character spacing lengths and word spacing lengths tend to be significantly different from each other in typical text. This effect can be seen in a spacing distribution histogram, an example of which is schematically illustrated in FIG. 3. In the spacing distribution histogram, the horizontal axis (bins) represents the spacing segment length and the horizontal axis represents the number or count of spacing segments having a particular length. Two peaks can be seen in the histogram of FIG. 3; the first peak, at smaller segment lengths, generally corresponds to character spacing, i.e. white spaces between neighboring characters, and the second peak, at larger segment lengths, generally corresponds to word spacing, i.e. white spaces between neighboring words. The first peak (character spacing) is generally higher because there are a larger number of spaces between characters than between words in a line. This bimodal characteristic is used in the embodiments of the present invention to distinguish word spacing and character spacing. It should be noted that the spacing distribution histogram such as that shown in FIG. 3 is not actually generated as a step of the word segmentation method; it is shown here only to illustrate the bimodal distribution.

Referring back to FIG. 1, in step S13, cluster analysis is applied to the set of spacing segments generated in step S12 to classify each spacing segment as either character spacing or word spacing.

Cluster analysis (also called clustering) is a technique used in statistical data analysis (data mining), machine learning, and other fields. The main goal of cluster analysis is to classify a set of data objects into groups, where objects within a group are more similar to each other than to objects in other groups by some defined measure. Various clustering algorithms are known. Known algorithms that may be used to classify data objects (e.g. spacing segments) into two groups include k-means, Otsu's method, and Gaussian Mixture Modeling. K-means and Gaussian Mixture Modeling can be used to classify data objects into multiple (more than two) clusters. Otsu's method, which is conventionally used for image binarization, can be used to classify data objects into two groups.

Embodiments of the present invention employ the k-means algorithm to perform clustering of the set of spacing segments; the number of clusters is set to 2, because the spacing length distribution is known to be bimodal. The complexity of the k-means algorithm ($O(n)$, where n is the number of samples) is less than that of hierarchical clustering ($O(n^3)$).

A preferred embodiment of the present invention uses the k-means algorithm with k-means++ initialization to perform clustering. K-means++ is described in David Arthur and Sergei Vassilvitskii, "k-means++: The Advantage of Careful Seeding", 18th annual ACM-SIAM symposium on Discrete algorithms (2007). The k-means++ method attempts to spread out the k initial cluster centers in order to prevent poor convergence speed. After the first cluster center has been chosen uniformly at random from the data samples, each subsequent cluster center is selected from the rest of the data points based on the probability proportional to its square distance to the closest existing cluster center.

One particular implementation of this embodiment uses the OpenCV implementation of k-means++, namely, in the OpenCV function "kmeans", the parameter "flags" is set to KMEANS_PP_CENTERS. Further, the input parameter "cluster_count" (the number of clusters to split the set by) is set to 2. The OpenCV function kmeans is available as a part of the OpenCV (Open Source Computer Vision Library) library and its documentation may be found at: http://docs.opencv.org/modules/core/doc/clustering.html or other available sources.

The k-means++ algorithm can find a clustering solution that is O(log k) competitive to the optimal k-means solution (where k is the number of clusters).

In step S13, the k-means algorithm outputs a classification (represented by a cluster index, or class label) for each spacing segment in the data set, i.e., whether the spacing segment belongs to the first or the second the cluster, as well as the means (cluster center) for each cluster and a variance (called compactness in kmeans). The means of each cluster (i.e. the cluster center) gives the mean length of the spacing segments in that cluster; the cluster center with the smaller means value can be deemed to correspond to character spacing and the cluster center with the larger means value can be deemed to correspond to word spacing. The compactness calculated by k-means is an overall measure of how close the data samples are to the respective cluster centers, as generally expressed in the following equation:

$$\text{compactness} = \Sigma_i \|\text{samples}_i - \text{centers}_{labelsi}\|^2$$

where each samples, is a data sample, $labels_i$ is the index of the cluster to which that sample belongs, and $centers_{labelsi}$ is the center of the cluster to which that sample belongs. The compactness may be used to judge the quality of the cluster analysis. If the compactness is larger than a certain threshold value, it means that the data is not a good bimodal distribution; in such a situation the algorithm is not suitable for word segmentation.

It is noted that the output of some kmeans program does not associate the cluster labels with the cluster centers. In other words, while each sample is assigned a label of either "1" or "2", and two cluster centers are outputted, the label "1" is not necessarily associated with the first cluster center. Thus, step S14 automatically associates the two labels "1" and "2" with the two cluster centers. To do this, the class label for a selected sample point (e.g. the first sample point), the value of that sample point (i.e. the length of that spacing), and the one of the two cluster centers values with a larger length value (deemed the word spacing cluster center) are obtained. If the difference between the value of the selected sample point and the word spacing cluster center is less than a threshold value, the class label for to the selected sample point is deemed to correspond to the word spacing cluster; otherwise the class label for to the selected sample point is deemed to correspond to the character spacing cluster.

Step S14 can be omitted if the clustering algorithm already outputs an association between the class labels and the cluster centers. By steps S13 and S14, each spacing segment of the text line is classified as either a character spacing segment or a word spacing segment.

In step S20 (referred to as pruning or validation), the text line is again evaluated to exclude single word lines or other atypical lines using the result of the clustering step. Single word lines may be, e.g., lines that consist of a single word with punctuation, a single table item, a single word with relatively large spaces between characters, etc. Pruning is a knowledge-based process. Pruning will be described in more detail later.

In step S15, word spacing segments obtained in step S14 (and after pruning in step S20) are used to extract words from the line. Each sub-image of the line image located between two neighboring word spacing segments is extracted as a word image. In the extracted word images, extra margin spaces are trimmed by further horizontal and vertical projections. A bounding box for each word image is generated, represented by two pair of coordinates, e.g. the upper-left and bottom-right corners of the bounding box.

The above described method of applying cluster analysis to spacing segments of a text line often does not work well for short lines, in particular, lines that have only one word. Such lines may exist as the last line of a paragraph, or as a part of a table, etc. For such short lines, the spacing length distribution often does not follow a clear bimodal form as there are very few or no word spacing in the line. Thus, in one embodiment of the present invention (steps S16 and S18), prior to applying cluster analysis, short lines and single word lines are detected and are not subject to the cluster analysis. However, such detections are not perfect; thus, a pruning step (S20) after clustering is also needed to further deal with atypical text lines.

Short line and single line detection can be performed at any time before cluster analysis. In the embodiment shown in FIG. 1, a determination is made initially as to whether the line being processed is a short line or not, based on the length of the line (step S16). A line shorter than a predetermined threshold length is deemed a short line, and a separate short line processing is carried out (step S17). The predetermined threshold length may be, for example, 800 pixels, or 1 inch, etc.

Figure 2:
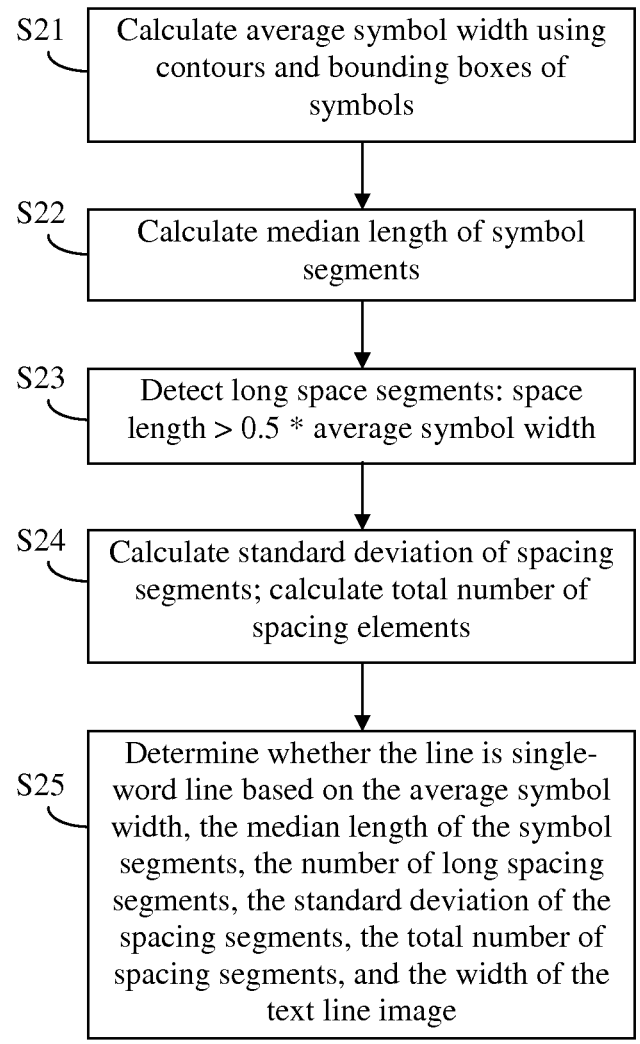
FIG. 2 schematically illustrates a process of detecting single word lines in the method of FIG. 1.

Then, a step S18 of determining whether the line is a single text line is carried out after the spacing and symbol segments are extracted in step S12, because it utilizes the spacing segments and symbol segments calculated in that step. Step S18 is described in more detail below with reference to FIG. 2 (i.e., steps S21 to S25 of FIG. 2 collectively constitute step S18 of FIG. 1).

In step S21, an average symbol width is calculated. This step includes computing contours of characters with hierarchical information (i.e. whether a contour line is an inside contour or outside contour); computing bounding boxes of each contour with positive hierarchy (i.e. the outside contour); and calculating a median value of all bounding box widths as the average symbol width. Methods for computing contours are known; implementation algorithms are also publicly available. In one particular embodiment, OpenCV function findContours is used, with the mode set to one which retrieves all contours with a two-level hierarchy (parent and child), and the contour approximation method set to one that obtains all the contour points. It is noted that step S21 does not depend on any input from step S12 and therefore can be performed before steps S11 and S12. In step S22, the median length of all symbol segments calculated in step S12 is calculated. It should be noted that in this disclosure, the terms "width" and "length" are used interchangeably and they are both measured in the horizontal direction.

In step S23, the spacing segments of the line obtained from step S12 are examined to determine whether the line contains any long spaces, defined as space segments longer than a predetermined fraction (e.g., 0.5) of the average symbol width calculated in step S21. Note that the first and last spaces have been removed from the line segment. In step S24, the standard deviation of the spacing segments and the total number of spacing segments in the line are calculated. Then, in step S25, these values are used to determine whether the line is a single word line or not. It should be noted that the criteria described below are only examples; other criteria may be used. The suitable criteria may be developed based on knowledge and experience. According to a first set of criteria, a line is not a single word line if (1) the standard deviation of the spacing segments is greater than a threshold value (e.g., 2.5 pixels) and the total number of spacing segments in the line is greater than a threshold value (e.g., 3); or (2) the line contains one or more long spaces; or (3) the line width is greater than a predetermined multiplier (e.g., 6 times) of the median length of symbol segments. According to a second set of criteria, a line is not a single word line if (1) the text line width is greater than a threshold value (e.g. 800 pixels); or (2) the line contains one or more long spacing segments and the text line width is greater than a predetermined multiplier (e.g., 6 times) of the median length of symbol segments. In one embodiment, a line is deemed not to be a single word line if it passes both the first set of criteria and the second set of criteria.

As shown in FIG. 1, non-single word lines are processed using cluster analysis, while single word lines are processed separately.

While one method of detecting short line and single word line is described above, it should be noted that other suitable methods and criteria may be used to detect such lines, and the invention is not limited to the specific method described here.

As noted above, even when short line and single word line detection steps are carried out, there is still a possibility that short or single word lines may be passed through to the cluster analysis steps S13 and S14. Therefore, the pruning step S20 is helpful to further ensure that these special lines are separated out for special processing. Pruning is done by using the result of the clustering step, such as the cluster center values and the compactness. Because pruning is for dealing with atypical text lines, and there can be many kinds of atypical text lines, pruning rules are typically knowledge-based. The pruning rules described below are merely examples, and other rules may be designed based on experience.

In one embodiment, if any of the following pruning conditions is met, the text line may be deemed a single-word line.

(1) First Example

The total number of word spacing segments calculated from the clustering result is one, only one symbol segment exists after the one word spacing segment, and the length of that symbol segment is less than twice the median length of symbol segments (as calculated in step S18). This condition may corresponds to a text line that has only one word, followed by a relatively large space, followed by a punctuation mark, such as "Excellent !".

(2) Second Example

The average word length is less than twice of the median length of symbol segments (as calculated in step S18). Here, the average word length is defined as the text line length divided by the number of words, where the number of words equals the number of word spacing labels plus one. This condition may correspond to a single-word line with relatively spaces between characters, for example, "(90.8%)"). These types of lines may occur in tables.

(3) Third Example

The difference between the two cluster centers (as calculated by the clustering algorithm in step S13) is less than a threshold difference value, and the text line width is less than a threshold line length (e.g. 800 pixels), and only one symbol segment exists after the last word spacing segment.

(4) Fourth Example

The compactness (as calculated by the k-means clustering algorithm in step S13) is less than a compactness threshold value, and the difference between the two cluster centers is less than a second threshold difference value. The second threshold difference value is smaller than the threshold difference value used in the third example. This condition may correspond to a line containing a single long word.

(5) Fifth Example

The compactness is greater than a second compactness threshold value. This means the spacing segment length does not have a bimodal distribution.

In step S20, if any of the above conditions are met, the line is processed as a single word line (step S19).

In steps S17 and S19, if the line is a short line or single word line, the entire line is treated as one word; i.e., it is no further segmented into multiple words. The bounding box of the single word is obtained from the entire line, by trimming extra margin spaces using horizontal and vertical projections.

The word segmentation method described here has many advantages. First, the distinction between word spacing and character spacing is calculated dynamically for each line. Second, no detection process is required to detect special symbols such as dash, tilde, various kinds of parentheses, etc. Third, no heuristic threshold is needed in the process (i.e. the process is unsupervised), even if a document image contains different font sizes or if different text lines have variable word distances. Fourth, the cluster analysis algorithm employed here is fast, because the k-means++ algorithm is $O(n)$, rather than $O(n^3)$ as in the case of hierarchical clustering, and because the number of clusters (two) is defined in advance by taking advantage of the bimodal nature of the spacing distribution. Fifth, the k-means algorithm for cluster analysis provides the compactness measure that can be used for pruning the clustering result to exclude single word lines (including single table items, etc.). Some other clustering methods, such as the Otsu method, do not output this type of information and therefore does not aid easy pruning.

The word segmentation method described here can provide high segmentation accuracy. It can work well for italic text line, and work well when the text contains disintegrated characters (broken characters) due to imperfect binarization. It may work well for text of different western languages.

Figure 4:
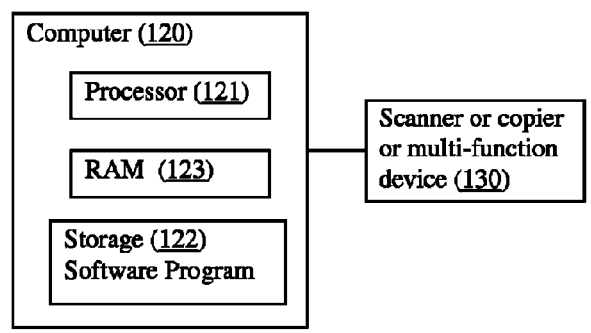
FIG. 4 schematically illustrates a data processing apparatus in which embodiments of the present invention may be implemented.

The word segmentation methods described here can be implemented in a data processing apparatus such as a computer 120 shown in FIG. 4. The computer 120 includes a processor 121, a storage device (e.g. hard disk drive) 122, and an internal memory (e.g. RAM) 123. The storage device 122 stores software programs, which are read out to the RAM 123 and executed by the processor 121 to carry out the methods described here. The computer 120 may be connected to a scanner, copier or multi-function device 130 which has a scanning section that can be used to scan a printed document to be processed by the computer 120. Alternatively, the processor 121, storage device 122 and RAM 123 may be located within the scanner/copier/multi-function device 130, in which case the scanner/copier/multi-function device can directly output processed document such as OCR'ed text. The term data processing apparatus may refer to either the computer 120 or the scanner/copier/multi-function device 130.

In one aspect, the invention is embodied in a data processing apparatus. In another aspect, the invention is computer program product embodied in computer usable non-transitory medium (e.g. storage 122) having a computer readable program code embedded therein for controlling a data processing apparatus. In another aspect, the invention is a method carried out by a data processing system.

It will be apparent to those skilled in the art that various modification and variations can be made in the word segmentation method of the present invention without departing from the spirit or scope of the invention. Thus, it is intended that the present invention cover modifications and variations that come within the scope of the appended claims and their equivalents.

What is claimed is:

1. A word segmentation method carried out by a computer for segmenting a text line image into a plurality of word images, comprising:
   (a) obtaining a plurality of one-dimensional spacing segments and symbol segments from the text line image, the spacing segments corresponding to white spaces within the text line image, and the symbol segments corresponding to text symbols within the text line image, each of the spacing segments having a length;
   (b) applying cluster analysis to the plurality of spacing segments, to classify the plurality of spacing segments into a plurality of character spacing segments and a plurality of word spacing segments based on their lengths, including applying a k-means algorithm with k-means++ initialization to the lengths of the plurality of spacing segments while setting a number of clusters to two;

(c) obtaining the plurality of word images from the text line image by using the plurality of word spacing segments obtained in step (b).

2. The method of claim 1, wherein step (a) comprises:

generating a one-dimensional vertical projection profile $f(x)$ of the text line image, where x is a horizontal pixel position and f is a number of black pixels in the text line image at each horizontal pixel position;

smoothing the vertical projection profile using a moving average method;

thresholding the vertical projection profile to generate a binary profile $g(x)$, where x is the horizontal pixel position and g indicates either white or black;

extracting consecutive pixel positions where the binary profile indicates white to obtain the spacing segments.

3. The method of claim 1, further comprising, prior to step (b), (d) determining whether the text line image is a short line or a single word line, wherein step (b) is performed only when the text line image is not determined to be a short line or a single text line.

4. The method of claim 3, wherein the determining step (d) comprises:

if a length of the text line image is shorter than a threshold length, determining the text line image to be a short line.

5. The method of claim 3, wherein the determining step (d) comprises:

calculating an average symbol width using bounding boxes of the text symbols in the text line image;

calculating a median length of the plurality of symbol segments obtained in step (a); and obtain a number of long spacing segments in the text line image, by determining whether each spacing segment obtained in step (a) is a long spacing segment which is longer than a predetermined fraction of the average symbol width;

calculating a standard deviation of the spacing segments and a total number of spacing segments in the text line image;

wherein in step (d) the determination is based on the average symbol width, the median length of the symbol segments, the number of long spacing segments, the standard deviation of the spacing segments, the total number of spacing segments, and a width of the text line image.

6. The method of claim 1, wherein step (b) calculates a compactness value, a total number of word spacing segments, a mean length of the plurality of character spacing segments and a mean length of the plurality of word spacing segments, and wherein the method further comprises, after step (b) and before step (c), determining whether the text line image is a single word line using at least one value from the group consisting of: the compactness value, the total number of word spacing segments, the mean length of the plurality of character spacing segments, and the mean length of the plurality of word spacing segments.

7. The method of claim 6, wherein the determining step determines the text line image to be a single word line if: the total number of word spacing segments is one, and only one symbol segment exists after the one word spacing segment, and a length of that symbol segment is less than twice a median length of the plurality of symbol segments obtained in step (a).

8. The method of claim 6, wherein the determining step determines the text line image to be a single word line if: an average word length is less than twice of a median length of the plurality of symbol segments obtained in step (a), wherein the average word length is defined as a length of the text line image divided by a total number of words, the total number of words being equals the total number of word spacing segments plus one.

9. The method of claim 6, wherein the determining step determines the text line image to be a single word line if: a difference between the mean length of the plurality of character spacing segments and the mean length of the plurality of word spacing segments is less than a threshold difference value, and a length of the text line image is less than a threshold line length, and only one symbol segment exists after a last word spacing segment.

10. The method of claim 6, wherein the determining step determines the text line image to be a single word line if: the compactness is less than a compactness threshold value, and a difference between the mean length of the plurality of character spacing segments and the mean length of the plurality of word spacing segments is less than a threshold difference value.

11. The method of claim 6, wherein the determining step determines the text line image to be a single word line if the compactness is greater than a compactness threshold value.

12. A computer program product comprising a computer usable non-transitory medium having a computer readable program code embedded therein for controlling a data processing apparatus, the computer readable program code configured to cause the data processing apparatus to execute a word segmentation process for segmenting a text line image into a plurality of word images, the process comprising:

(a) obtaining a plurality of one-dimensional spacing segments and symbol segments from the text line image, the spacing segments corresponding to white spaces within the text line image, and the symbol segments corresponding to text symbols within the text line image, each of the spacing segments having a length;

(b) applying cluster analysis to the plurality of spacing segments, to classify the plurality of spacing segments into a plurality of character spacing segments and a plurality of word spacing segments based on their lengths, including applying a k-means algorithm with k-means++ initialization to the lengths of the plurality of spacing segments while setting a number of clusters to two;

(c) obtaining the plurality of word images from the text line image by using the plurality of word spacing segments obtained in step (b).

13. The computer program product of claim 12, wherein step (a) comprises:

generating a one-dimensional vertical projection profile $f(x)$ of the text line image, where x is a horizontal pixel position and f is a number of black pixels in the text line image at each horizontal pixel position;

smoothing the vertical projection profile using a moving average method;

thresholding the vertical projection profile to generate a binary profile $g(x)$, where x is the horizontal pixel position and g indicates either white or black;

extracting consecutive pixel positions where the binary profile indicates white to obtain the spacing segments.

14. The computer program product of claim 12, wherein the process further comprises, prior to step (b),
  (d) determining whether the text line image is a short line or a single word line,
  wherein step (b) is performed only when the text line image is not determined to be a short line or a single text line.

15. The computer program product of claim 14, wherein the determining step (d) comprises:
  if a length of the text line image is shorter than a threshold length, determining the text line image to be a short line.

16. The computer program product of claim 14, wherein the determining step (d) comprises:
  calculating an average symbol width using bounding boxes of the text symbols in the text line image;
  calculating a median length of the plurality of symbol segments obtained in step (a); and
  obtain a number of long spacing segments in the text line image, by determining whether each spacing segment obtained in step (a) is a long spacing segment which is longer than a predetermined fraction of the average symbol width;
  calculating a standard deviation of the spacing segments and a total number of spacing segments in the text line image;
  wherein in step (d) the determination is based on the average symbol width, the median length of the symbol segments, the number of long spacing segments, the standard deviation of the spacing segments, the total number of spacing segments, and a width of the text line image.

17. The computer program product of claim 12, wherein step (b) calculates a compactness value, a total number of word spacing segments, a mean length of the plurality of character spacing segments and a mean length of the plurality of word spacing segments, and wherein the method further comprises, after step (b) and before step (c), determining whether the text line image is a single word line using at least one value from the group consisting of: the compactness value, the total number of word spacing segments, the mean length of the plurality of character spacing segments, and the mean length of the plurality of word spacing segments.

18. The computer program product of claim 17, wherein the determining step determines the text line image to be a single word line if: the total number of word spacing segments is one, and only one symbol segment exists after the one word spacing segment, and a length of that symbol segment is less than twice a median length of the plurality of symbol segments obtained in step (a).

19. The computer program product of claim 17, wherein the determining step determines the text line image to be a single word line if: an average word length is less than twice of a median length of the plurality of symbol segments obtained in step (a), wherein the average word length is defined as a length of the text line image divided by a total number of words, the total number of words being equals the total number of word spacing segments plus one.

20. The computer program product of claim 17, wherein the determining step determines the text line image to be a single word line if: a difference between the mean length of the plurality of character spacing segments and the mean length of the plurality of word spacing segments is less than a threshold difference value, and a length of the text line image is less than a threshold line length, and only one symbol segment exists after a last word spacing segment.

21. The computer program product of claim 17, wherein the determining step determines the text line image to be a single word line if: the compactness is less than a compactness threshold value, and a difference between the mean length of the plurality of character spacing segments and the mean length of the plurality of word spacing segments is less than a threshold difference value.

22. The computer program product of claim 17, wherein the determining step determines the text line image to be a single word line if the compactness is greater than a compactness threshold value.

* * * * *